Patented Jan. 21, 1936

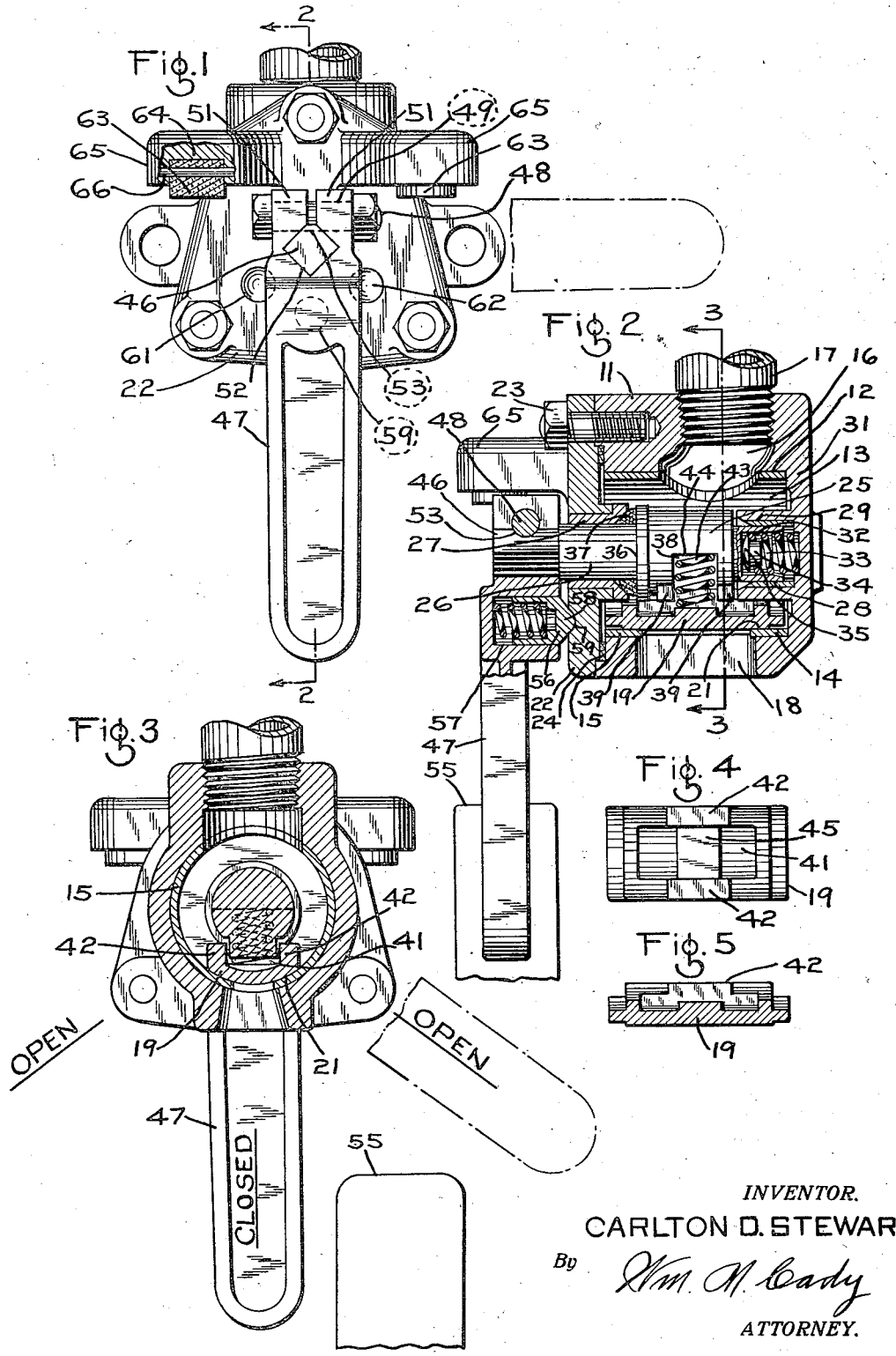

2,028,726

UNITED STATES PATENT OFFICE 2,028,726

TRIP COCK DEVICE

Carlton D. Stewart, Berkeley, Calif., assignor to The Westinghouse Air Brake Company, Wilmerding, Pa., a corporation of Pennsylvania Application July 7, 1932, Serial No. 621,197

1 Claim. (Cl. 251—153)

This invention relates to apparatus for automatically stopping trains equipped with fluid pressure brakes and particularly to trip valve devices for automatically venting fluid from the train pipe for effecting an application of the brakes.

An object of the invention is to provide a trip valve device, wherein an improved form of rotary valve is utilized for venting fluid from the brake pipe, and wherein the moving valve parts are relatively light and, therefore, have relatively small inertia and the valve operating parts are made rugged and durable, so that they may effectively withstand severe shock incident to operation.

A further object of the invention is to provide a trip valve device of the rotary type, wherein the valve is yieldingly arrested in closed and in its two open positions, so that it will remain in its closed position until automatically tripped to open position and remain in either of its open positions until manually moved or returned to closed position, and wherein the valve lever is permitted to overtravel beyond the valve open positions thereof in order that the frictional resistance of the valve may be utilized in retarding its opening movement, and wherein resilient means are provided for limiting said overtravel of the lever after it has moved a predetermined distance beyond either valve open position of the lever.

A further object of the invention is to provide a simple and inexpensive trip valve device that is rugged and durable and which may be readily assembled or dismantled for the purpose of inspection or repair.

These and other objects of the invention that will be made apparent throughout the further description thereof are attained by means of the trip valve device hereinafter described and illustrated in the accompanying drawing; wherein Fig. 1 is an elevational view partially in section of a trip valve device embodying features of the invention;

Fig. 2 is a longitudinal sectional view of the trip valve device shown in Fig. 1, the section being taken on the line 2—2 of Fig. 1;

Fig. 3 is a transverse sectional view of the trip valve device, the section being taken on the line 3—3 of Fig. 2;

Fig. 4 is a plan view of the segment valve shown in Fig. 2; and

Fig. 5 is a longitudinal section through the valve shown in Fig. 4.

Referring to the drawing, the trip valve device comprises a casing 11 having a cylindrical bore 12, which constitutes a valve chamber 13 having a cylindrical wall 14 formed by a cylindrical bushing 15 that is disposed within the bore 12.

The chamber is provided with an inlet port 16 having a threaded portion adapted to receive the threaded end of the brake pipe 17 of the usual fluid pressure brake equipment (not shown) and an outlet port 18 that is adapted to be closed by a segment valve 19 that is slidably mounted within the chamber and which is yieldingly pressed against the cylindrical wall thereof, which constitutes a valve seat 21.

The casing 11 is provided with a fluid tight cover 22 that is secured to the casing by means of bolts 23, with a packing gasket 24 disposed between the cover and the outer end face of the casing 11. A valve 19 is adapted to be operated by a valve operating shaft 25 having a stem 26 that is journaled in a bushing 27 carried by the cover 22 and in a bushing 28 disposed in a recess 29 in the end wall 31 of the casing 11. The inner end of the shaft 25 is provided with a recess 32 for receiving a spring 33 which is disposed between the end wall 31 of the casing and an anti-friction stud 34 having a rounded head 35 which bears against the bottom of the recess 32 in the shaft 25 as indicated in Fig. 2. The spring 33 serves to yieldingly press the shaft 25 outwardly, so that the sealing flange 36 of the shaft 25 is pressed against an annular packing 37 disposed between the flange 36 and the inner end of the bushing 27. A fluid tight joint is thus provided surrounding the shaft, which prevents leakage of fluid from between the shaft stem 26 and the bushing 27.

The enlarged portion of the shaft 25 is provided with a notch 38, which extends transversely thereof as indicated in Fig. 3, and a pair of spaced projections 39 which extend into the recess 41 in the segment valve 19. The projections are adapted to engage side lugs 42 integrally formed on the segment valve 19. Thus a lost motion connection is provided between the shaft 25 and the segment valve 19, whereby the segment valve is moved upon its cylindrical seat 21 when the shaft 25 is rotated a predetermined distance.

A helical spring 43 is disposed within the recess 38 in the shaft 25 between the bottom 44 of the recess and a seat 45 on the segment valve 19. Since the end of the spring in engagement with the seat 45 is disposed between the lugs 42 on the segment 19, the spring is retained in assembled position as shown in Figs. 2 and 3.

The outer end of the shaft stem 26, which projects from the cover 22, is provided with a square portion 46 upon which an operating trip lever 47 is clamped by means of a bolt 48 which extends through bores 49 in the prongs 51 of the slotted end of the lever. The square portion 46 of the shaft extends through a square hole 52 in the lever and consequently the lever is secured against relative rotary movement with respect to the shaft when the bolt 48 is tightened. The upper corner of the square portion 46 on the stem 26 is provided with a notch 53 which is engaged by the bolt 48, and consequently the handle 47 is retained against longitudinal movement along the square portion of the stem.

The brake valve device is adapted to be secured or fixed to a car or locomotive (not shown) in such position that the trip lever 47 will be engaged by a track trip 55 that is movable to the position shown near the rails for the vehicle, when it is desired to automatically stop a passing train. Normally the segment valve 19 and lever 47 are in the closed position shown in Figs. 1 and 3, where the valve is yieldingly retained frictionally upon its seat 21 by the spring 43 and by the fluid pressure within the chamber 13 to which the inner face of the segment valve 19 is subjected. The valve and lever are also frictionally retained in the closed position by means of a stop plunger 56 which is slidably disposed within a bore 57 in the lever 47. The outer end of the plunger 56 is provided with a spherical portion 58 that is adapted to be yieldingly pressed in to spherical recesses 59, 61 and 62, provided in the outer face of the cover 22.

As shown in Fig. 2, the plunger 56 is engaging the recess 59 and the lever 47 is yieldingly retained in the closed position shown in Figs. 2 and 3. In order to move the valve to an open position, the frictional resistance of the valve 19 upon its seat and the tension of the spring 57 must be overcome, and when the lever 47 is moved to either of the open valve positions on either side of the central closed position the movement of the lever will be yieldingly arrested when the plunger 56 is pressed into either of the recesses 61 and 62 in the cover 22.

Opening movement of the lever 47 toward either of its open positions is limited by the engagement of the lever with either one of a pair of rubber stop members 63 that are mounted in recesses 64 in the lugs 65 that are formed integrally with the cover 22 the stop members being retained by means of pins 66 which extend through the lug members as indicated in Fig. 1. The extreme limit of opening movement is indicated by the dotted line position of the handle shown in Fig. 1 to which position the handle may be frequently thrown in the event that it is engaged by the track trip 55 while the vehicle upon which the valve device is mounted is moving at a high rate of speed. By permitting a relatively large amount of over travel of the valve and lever 47 the rotative movement of the lever is frictionally opposed by the valve 19 and only in the event of operation of the trip lever while the vehicle is moving at relatively high velocity, will the lever be moved to its extreme limit of movement against the yielding stop member 63.

Should the weight of the lever 47 and the vibration of the vehicle cause the lever to move from an extreme open position toward closed position, this movement will be arrested while the handle and valve are still in valve open position when the plunger 56 is aligned with and engages in either of the recesses 61 or 62.

In operation, the lever 47 is in the closed position. When, for any reason, the lever 47 encounters a track trip 55, the lever will be forced to an open position wherein the vent port 18 is uncovered by the valve 19 and fluid under pressure is vented from the brake pipe 17, thereby causing an application of the brakes on the vehicle or train as the case may be. The lever 47 will remain in open position by reason of the yielding engagement of the plunger 56 with a recess 61 or 62. In order that the brakes on the train or car may be released, it is necessary for a trainman to first manually move the lever 47 to the closed position. Therefore, the train or vehicle cannot again be moved until the trip valve device is restored to its original closed position.

The valve device is herein disclosed as a part of an automatic trip valve device for fluid pressure brakes, but it will be understood that the valve structure may be employed wherever it is desirable to control the delivery of fluid under pressure.

While but one embodiment of the invention is herein disclosed, it is obvious that many changes may be made in the construction without departing from the spirit of the invention.

Having now described my invention, what I claim as new and desire to secure by Letters Patent, is:

A trip valve device comprising a casing, a rotary valve therein movable in opposite directions from a central valve closed position to a valve open position on either side of said central closed position, an operating lever for said valve adapted to be engaged by a trip member and to be moved thereby to move said valve to either of said valve open positions, means cooperating with said casing for yieldingly arresting movement of said lever in said valve closed and valve open positions, and yielding stop means cooperating with said casing and said lever for limiting the overtravel of the said lever at a distance beyond said valve open positions of said valve which distance is greater than the distance between said intermediate position and either of said operative positions.

CARLTON D. STEWART.